June 6, 1967

S. H. SIME 3,323,600

ROTARY HOE TRANSPORT

Filed Dec. 2, 1964

INVENTOR.
SYLVAN H. SIME
BY
John C. Thompson
ATTORNEY

June 6, 1967  S. H. SIME  3,323,600

ROTARY HOE TRANSPORT

Filed Dec. 2, 1964  3 Sheets-Sheet 3

INVENTOR.
SYLVAN H. SIME

BY John C. Thompson
ATTORNEY

United States Patent Office 3,323,600
Patented June 6, 1967

3,323,600
ROTARY HOE TRANSPORT
Sylvan H. Sime, Kiester, Minn. 56051
Filed Dec. 2, 1964, Ser. No. 415,315
7 Claims. (Cl. 172—321)

The present invention relates generally to agricultural implements and more particularly to transports for rotary hoes and the like.

One object of the present invention is to provide a semi-integral carrying frame for rotary hoe sections and the like in which more sections can be carried than can be carried integrally with a tractor. More particularly, it is an object of the present invention to provide a semi-integral transport for rotary hoe sections and the like in which a forward portion of the transport is secured to the lower draft links of a tractor and a rear portion of the transport is supported by castering wheels.

A further object of the present invention is to provide a transport for rotary hoe sections and the like in which a forward portion of the transport may be secured to the lower draft links of a tractor and a rear portion supported by wheel means for normal field work, and in which one of the wheel means is movable to a forward portion and means is provided at one end whereby the transport may be pulled in an endwise position when moving from one field to another or on the highway.

A still further object of the present invention is to provide means whereby the removable rear wheel of the transport is lifted off the ground when the transport is moved to its field working lowered position by moving the draft links of the tractor from a raised position to a lowered position. More specifically it is a further object to provide a stand engageable with the upper surfaces of a rotary hoe section to hold up a portion of the rotary hoe transport when the forward portion is held in its lowered position by the lower draft links of a tractor, the stand being disposed on the same side as the removable wheel with respect to the center of gravity of the transport.

A still further object of the present invention is to provide a transport for rotary hoe sections in which the sections are connected to the frame at a point lower than the frame's connection to the lower draft links of a tractor thereby giving better penetration.

A still further object of the present invention is to provide a rotary hoe transport in which the rotary hoe sections are supported in such a manner that when the forward end of the transport is raised by the lower draft links of the tractor the rotary hoes will be supported in a plane generally parallel to the surface of the ground.

Another object of the present invention is to provide a rotary hoe transport having castering rear wheels in which the rear wheels are held in such a position when working that their castering axis of rotation is disposed at an angle to the vertical thereby resisting the tendency of the wheels to caster, and in which during transport the castering axis of rotation is generally vertical thereby permitting free rotation of the ground-engaging wheels.

A still further object of the present invention is to provide a novel hitch device for interconnecting one end of the rotary hoe transport with the lower draft links of a tractor whereby the rotary hoe transport can be transported over highways in an endwise position.

These and other objects and advantages of this invention will be apparent to those skilled in the art after a consideration of the following detailed description, taken in conjunction with the accompanying drawings, in which the preferred form of this invention is illustrated.

In the following description right-hand and left-hand reference is determined by standing to the rear of the rotary hoe transport and facing the direction of travel.

Figure 1:
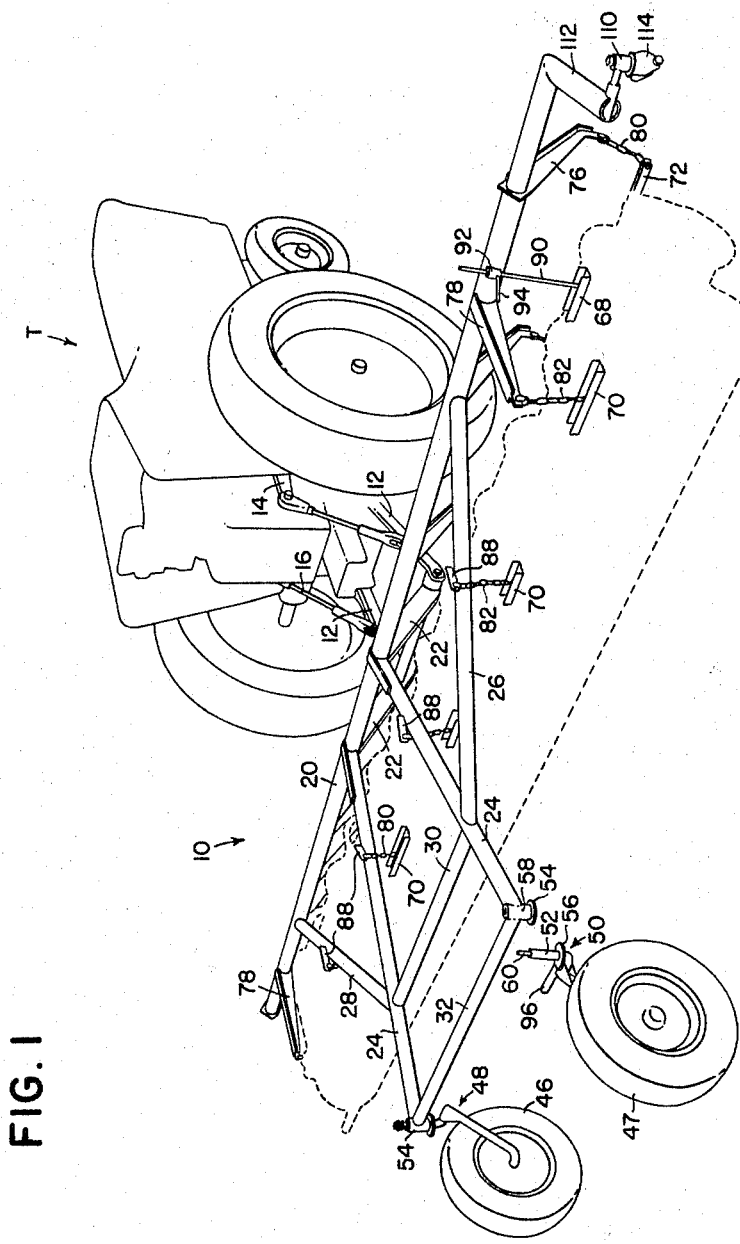
FIG. 1 is a perspective view of a tractor to which the rotary hoe transport of the present invention is secured.

Referring first to FIG. 1 the rotary hoe transport of the present invention, indicated generally at 10, is shown secured to the lower draft links 12 of a generally conventional farm tractor T. The lower draft links are raised and lowered by means of rock arms 14 and lift links 16 as is conventional.

Figure 4:
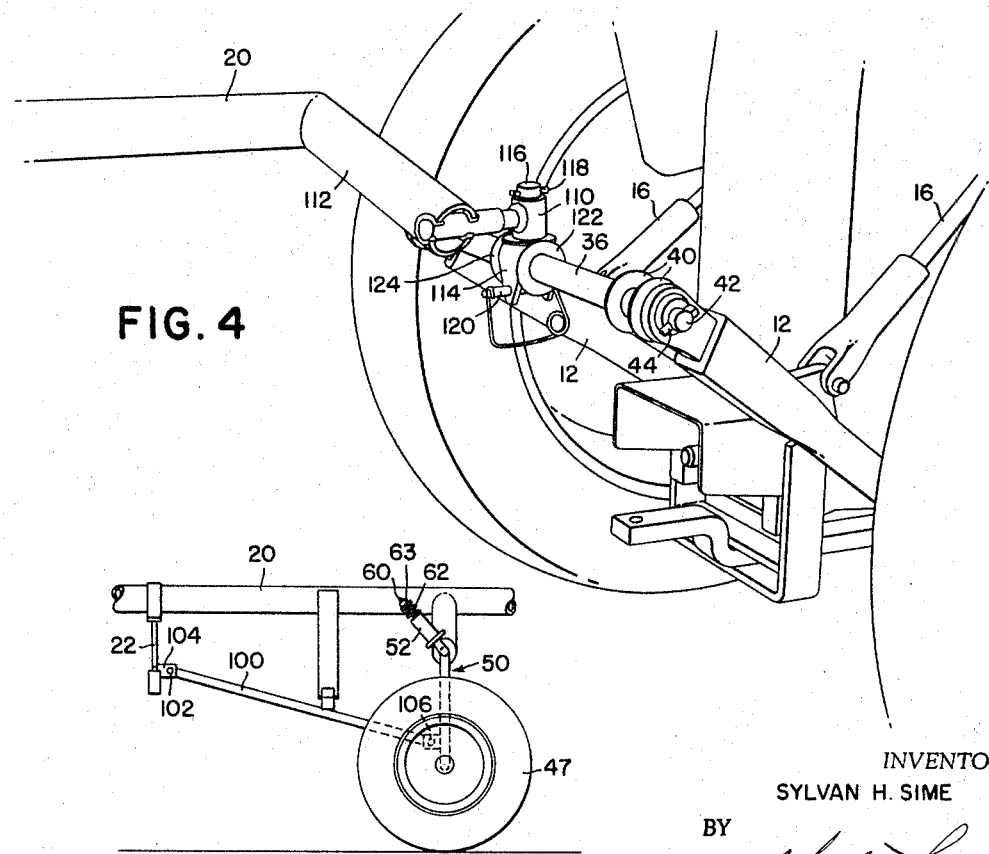
FIG. 4 is a perspective view of a novel hitch used to interconnect the rotary hoe transport with the tractor for endwise transportation of the rotary hoe transport.
Figure 5:
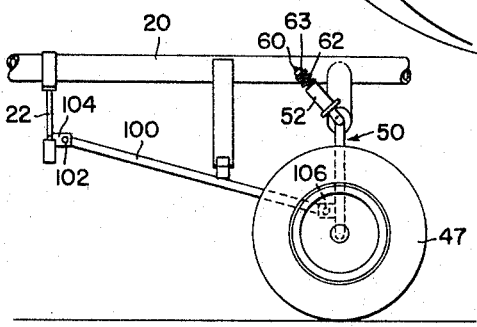
FIG. 5 is a view illustrating the removable wheel and axle assembly secured to a forward portion of the rotary hoe transport for endwise transport.

The rotary hoe transport is provided with a transversely extending main frame member 20 to which is secured a pair of forwardly and normally downwardly extending frame members 22 which are rigidly secured at their rear ends to the main frame member 20, and generally rearwardly extending frame members 24 which are rigidly secured at their forward ends to the main frame member 20. The rearwardly extending frame members are braced by means of right- and left-hand rods, 26 and 28, respectively, an intermediate brace 30, and by a rear brace 32. The forward ends of the forwardly and downwardly extending frame members are provided with open C-shaped members 34 which are disposable about the ends of a hitch bar 36, the C-shaped members being held by pins 38 and prevented from sliding by disks 40 (FIG. 4) which are welded or otherwise rigidly secured adjacent the ends of the hitch bar 36. The hitch bar is provided with reduced end portions 42 which are insertable through the apertured ends of the lower draft links 12 and held in place by means of conventional fasteners 44.

The rear end of the rotary hoe transport is supported by ground-engaging left- and right-hand wheels 46 and 47, respectively, which are carried by left- and right-hand axle means 48, 50, respectively, each of the axle means having an upwardly extending shaft portion 52 which is receivable within a sleeve 54 carried by the ends of the rearwardly extending frame members 24. The shaft 52 is held within the sleeve by means of a flange 56 below the shaft which abuts against a corresponding flange 58 mounted below the sleeve 54. The upper end of the shaft portion 52 is provided with a threaded stud 60 about which is normally disposed a spring member 62 and nut 63. The lower end of each of the right and left axle means is provided with a stub axle (no number) about which the ground-engaging wheels 46 and 47 are mounted for rotation.

Figure 2:
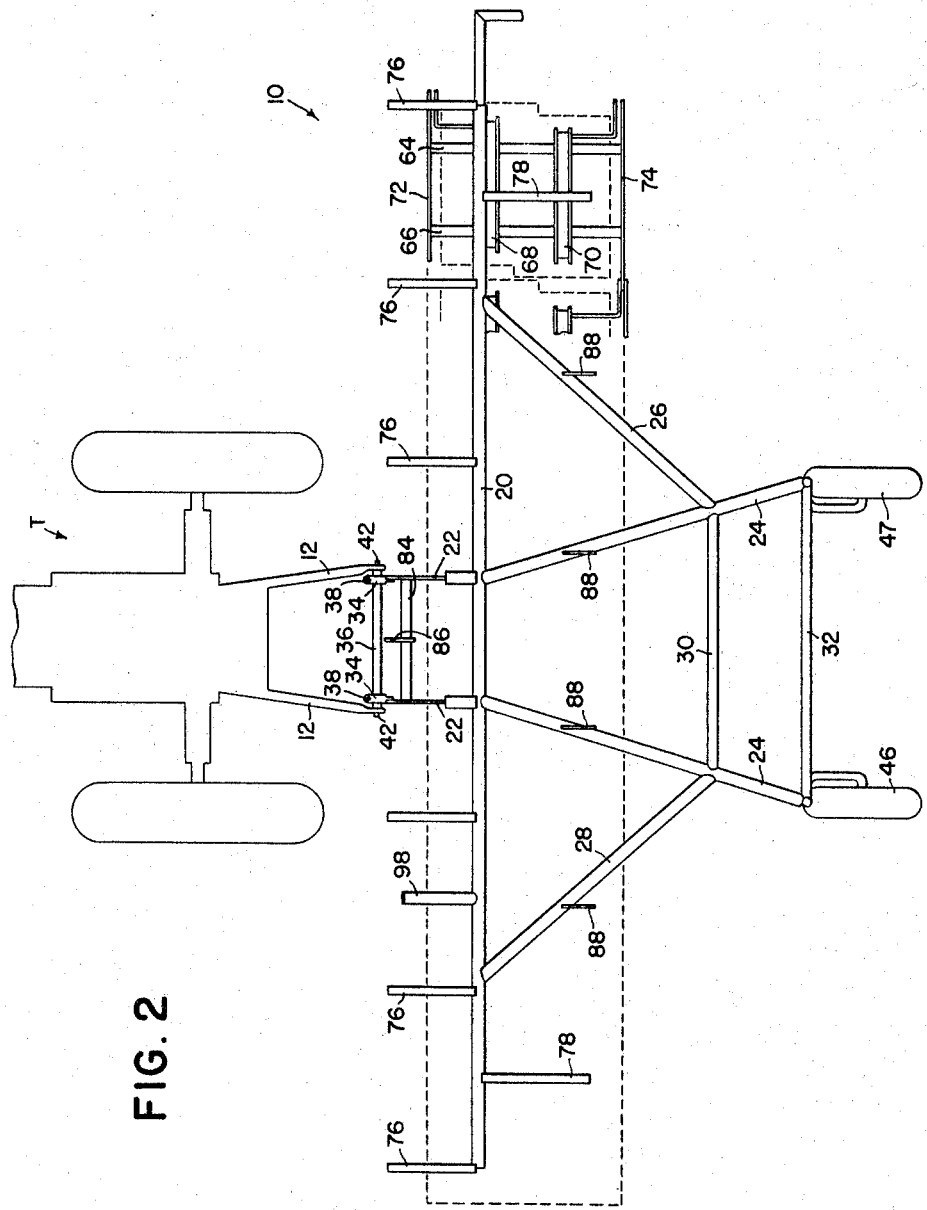
FIG. 2 is a plan view illustrating the rotary hoe transport secured to the lower draft links of a tractor.

A plurality of rotary hoe sections are normally supported by the transport frame of this invention. Each of the rotary hoe sections, as can best be seen from FIGS. 2 and 3, includes right and left generally downwardly facing U-shaped cross frame members 64 and 66, respectively, and front and rear downwardly facing U-shaped bearing frame members 68 and 70, respectively. Each of the front and rear U-shaped cross frame members supports an axle at its ends about which a plurality of rotary hoes are rotatably disposed. The front and rear ends of the U-shaped cross frame members 64 and 66 carry front and rear spacer bars 72 and 74, respectively, which are provided with means (not shown) by which the hoes can be secured for movement in either direction. The front spacer bars of adjacent gang sections and also the rear spacer bars of adjacent gang sections are pivotally interconnected in any suitable manner not material here.

The rotary hoe transport is provided with means to interconnect the front spacer bar 72 and the rear U-shaped bearing frame member 70 with the frame. These means include forwardly and downwardly extending arms 76 secured rigidly to the transversely extending main frame member 20, the forward arms 76 carrying chains 80 which interconnect the arm with an end of the front bar 72, and the rearward arms 78 carrying a similar short chain 82 which interconnects the arm 78 with the center portion of the U-shaped member 70. The arms 76 and 78 are preferably of the same length. In the central forward portion of the transport 10 other means are provided instead of the arm means 76 to interconnect the centrally located rotary hoe sections with the main frame. To this end a bar 84 is mounted between the forwardly and downwardly extending frame members 22 (FIG. 2) and suitable means 86 are mounted centrally on the bar to which a chain 80 can be secured. To secure the rear U-shaped members 70 of the intermediate rotary hoe sections to the frame short arms 88 are welded or otherwise secured to the right and left brace rods 26 and 28, and also to the rearwardly extending frame members 24. These short arms also carry chains 82 which are in turn secured to the rear U-shaped member 70. The chains 80 and 82 and the front carrying means 76 and 86 and the rear carrying means 78 and 88 are so dimensioned with respect to the rotary hoe sections that when the front end of the rotary hoe transport is raised from its working position, illustrated in the full lines in FIG. 3, to its field transport position, illustrated by the broken lines in FIG. 3, the rotary hoe sections will be held in a substantially parallel position with respect to ground surface. Thus, as can best be seen from FIG. 3, it will be noted that while the front of the hoe section carrying frame is raised more than the intermediate portions of the hoe carrying frame that the chain 80 will permit the front end of the rotary hoe section to swing downwardly more than will the rear chain 82.

Figure 3:
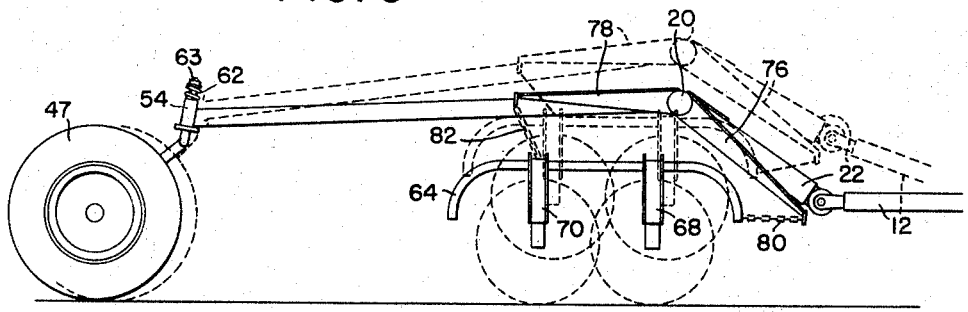
FIG. 3 is a side elevation view of the rotary hoe transport and rotary hoe sections secured to the lower draft links of a tractor, the full lines illustrating the rotary hoe transport and rotary hoe sections in their normal working position, and the dotted line view illustrating the rotary hoe transport and rotary hoe sections in their field transport position.

It should also be noted, with respect to FIG. 3, that the chain section 80 is secured to the rotary hoe transport at a point lower than the transport's hitch connection to the tractor. By having a low hitch point connection better penetration of the rotary hoe is achieved.

As also can be seen from FIG. 3 the sleeve section 54 to which the axle means 48 and 50 are rotatably disposed are disposed at an angle to the vertical when the rotary hoe transport is in its field working position. In this position when the hoe is being moved forwardly the wheels 46 will not tend to caster since castering movement in this position would tend to raise the hoe frame. However, when the hoe is raised to its field transport position, shown in dotted lines in FIG. 3, the sleeve section 54 will be generally vertically disposed. Therefore, the axles 48 and 50 will be free to caster when in field transport position.

It may be desirable when transporting the rotary hoe transport from one field to another to transport it in an endwise position. To this end means are provided whereby the right-hand rear wheel 47 may be removed and resecured to the forward left-hand portion of the rotary hoe transport, and additional means are also provided whereby the tractor may be secured to the right-hand end of the transversely extending main frame member. As previously described the right axle means 50 is secured to the associated sleeve section 54 by means of a nut 63 which engages the stud 60. To remove the axle means 50 and its associated wheel 47 it is only necessary to raise the sleeve section 54, remove the nut 63, and pull the shaft 52 out of the sleeve 54. To raise the sleeve 54 relative to the ground applicant has provided a stand 90 which is adjustably mounted on the transversely extending main frame member 20 by means of a bracket 92 which carries a locking member 94 which can hold the stand 90 in various positions of vertical adjustment. To raise the sleeve that carries the axle means 50 and its associated wheel it is only necessary to first raise the rotary hoe transport to its field working position. In this position the hoe sections will be in a free hanging position. Second, adjust the stand until it comes into contact with the front U-shaped bearing frame member 68 of the associated rotary hoe section, and then with member 94 lock the stand so it is not free to move within the bracket 92. Third, lower the rotary hoe transport to its field working position. The front right-hand end of the rotary hoe transport is now supported on the stand which engages the rotary hoe section, which in turn engages the ground, and the rear portion of the rotary hoe transport is supported by the axle means 48 and its associated wheel 46. Since these two points of contact are to the right of the transport's center of gravity, and also since the right-hand section of the hoe transport is held above its normal position by the stand 90, the left-hand portion of the hoe transport will drop to a position lower than its normal working position. In this position the right-hand axle means 50 and its associated wheel 47 will be raised off the ground a distance sufficient to permit the shaft 52 and stud 60 to be easily withdrawn from the associated sleeve 54.

The axle means 50 may now be secured to the front left-hand portion of the rotary hoe transport. To this end the axle means 50 is provided with a second shaft 96 which is disposed generally parallel to the stub axle that carries the wheel 47. The front left-hand portion of the rotary hoe transport frame is provided with a sleeve carrying arm 98 which is secured at its rearward end to the transversely extending main frame member 20. The sleeve in the arm 98 is disposed in a fore-and-aft extending direction and is suitably sized to receive the shaft 96 for pivotal movement therein. The shaft 96 may be held within the sleeve 98 in any suitable means and brace means 100 is provided to hold the wheel from swinging. The forward end of the brace means is secured by conventional pin means 102 to a bracket 104 carried by the left-hand forwardly and downwardly extending frame member 22, and the rear end of the link is secured in a suitable manner to a bracket 104 carried by the right axle means 50 at a point adjacent the stub axle for the wheel 46.

With the axle means 50 and its associated wheel in the position just described the rotary hoe transport may be transported on highways and from field to field merely by securing the right-hand end of the rotary hoe transport to the hitch bar 36 on the tractor. To this end novel hitch means are provided to interconnect the aforementioned parts. Carried by the right-hand end of the rotary hoe transport is a sleeve member 110 which is held generally on the center line between the axle means 48 and 50 when the axle means 50 is secured to the forward left-hand portion of the transport frame. To this end the sleeve is secured to one end of the transversely extending main frame member 20 by means of a rearwardly extending pipe member 112 which in turn carries the sleeve in any suitable manner. The sleeve member 110 in turn carries a saddle block 114 which is adapted to be disposed about the cylindrical hitch bar 36 carried by the tractor. The saddle block has an upwardly extending shaft portion 116 which is rotatably disposed within the sleeve 110 and held by means of a cotter pin 118. The downwardly extending ears of the saddle block are suitably apertured and pin means 120 may be disposed within the apertures to hold the saddle block for rotational movement about the cylindrical hitch bar 36. To prevent sliding on the hitch bar 36 right- and left-hand disks 122 and 124, respectively, are rigidly secured to the cylindrical hitch bar centrally thereof and spaced a distance apart equal to the width of the saddle block 114.

The operation of applicant's device should be obvious from the foregoing description. However, it should be noted, that when in the field transport position that by holding the semi-integral rotary hoe transport rigidly to the tractor by means of the lower draft links so that the transport cannot rotate with respect to the tractor, and by supporting the rear wheels of the transport on caster wheels so that the transport as a whole may turn when the tractor turns that the transport is always held crosswise behind the tractor. It should be noted that if the transport were free to pivot that the structure would tend to overturn the tractor when the tractor was turning. Thus, if the tractor were turning and it was necessary to slow down, the inertial force of a device pivoted to the tractor would tend to force the rear wheels of the tractor to one side thus tending to overturn the tractor.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In combination with a tractor having a pair of draft links whose rear ends are movable between lower and upper positions, a rotary hoe transport frame comprising a normally transversely extending main frame means to which a plurality of rotary hoe sections may be operatively secured, forwardly and generally downwardly extending hitch frame means rigidly secured at their rear ends to said main frame means, fastener means interconnecting the forward ends of said hitch frame means with the rear ends of said draft links, rearwardly extending support frame means rigidly secured at its forward end to said main frame means said support frame means having a length substantially exceeding the length of said hitch frame means, a pair of laterally spaced apart ground-engaging wheels, a pair of axle means interconnecting said wheels with the rear end of said support frame means for independent castering movement, at least one of said axle means being removably mounted on said support frame means, means mounted on said main frame means and extending forwardly thereof on which said last-mentioned axle means may be selectively secured, and further means operable to interconnect said main frame with said tractor whereby when said caster wheel is optionally attached to the front of the main frame means, the transport may be pulled endwise.

2. In combination with a tractor having a pair of draft links whose rear ends are movable between lower and upper positions, a rotary hoe transport frame comprising a normally transversely extending main frame means to which a plurality of rotary hoe sections are operatively secured, forwardly and generally downwardly extending hitch frame means rigidly secured at their rear ends to said main frame means, fastener means interconnecting the forward ends of said hitch frame means with the rear ends of said draft links, rearwardly extending support frame means rigidly secured at its forward end to said main frame means, a pair of laterally spaced apart ground-engaging wheel means carried by the rear end of said support frame means, at least one of said wheel means including a generally vertically disposed shaft engageable with a sleeve carried by the rear end of said support frame means, means mounted on one of said frame means and operable to raise said sleeve relative to the ground as said draft links are moved to their lower position whereby said shaft can be moved out of said sleeve without further raising of said sleeve, means mounted on said main frame means and extending forwardly thereof on which said last mentioned axle means may be selectively secured, and further means operable to interconnect said main frame with said tractor whereby when said caster wheel is optionally attached to the front of the main frame means, the transport may be pulled endwise.

3. The invention set forth in claim 2 in which means operable to raise said sleeve relative to the ground comprises a stand, and means mounted on said main frame means laterally outwardly of said sleeve means to hold said stand in selected positions of vertical adjustment, the lower end of said stand engaging one of the rotary hoe sections when said stand is in its low position of adjustment and said draft links are in their lower positions.

4. A semi-integral transport for rotary hoe sections comprising: a generally transversely extending main frame means, generally forwardly and downwardly extending hitch frame means rigidly secured at their rear ends to said main frame means, the forward end portion of said hitch frame means being securable to draft links of a tractor, rearwardly extending support frame means non-rotatably secured at the forward end to the main frame means, a pair of wheel means secured for castering movement to the rear of said support frame means, and means on said main frame means to which rotary hoe sections may be secured and including normally forwardly and downwardly extending arms to which the forward portion of hoe sections may be secured by means of chains, the forward ends of said arms being below the forward ends of said hitch frame means.

5. A semi-integral transport for rotary hoe sections comprising: a generally transversely extending main frame means, means rigidly secured to said main frame means and extending forwardly therefrom, said means being securable to the draft links of a tractor, support frame means non-rotatably secured to said main frame and extending rearwardly therefrom, first and second ground-engaging wheel means secured to said rearwardly extending support frame means for castering movement, said first ground-engaging wheel means including a structure having a normally transversely extending stub axle upon which a wheel is mounted, a normally upwardly extending shaft secured to said rearwardly extending means for castering movement of said wheel, sleeve means secured to said main frame, said last-mentioned sleeve means being disposed forwardly of the main frame means and extending in a generally forwardly direction, and further means operable to interconnect said main frame with said tractor whereby when said caster wheel is optionally attached to the front of the main frame means, the transport may be pulled endwise.

6. In combination with a tractor having a pair of draft links whose rear ends are movable between lower and upper positions, a rotary hoe transport frame comprising a normally transversely extending main frame means to which a plurality of rotary hoe sections are operatively secured, forwardly and generally downwardly extending hitch frame means rigidly secured at their rear ends to said main frame means, fastener means interconnecting the forward ends of said hitch frame means with the rear ends of said draft links, rearwardly extending support frame means non-rotatably secured at its forward end to said main frame means, and a pair of laterally spaced apart ground-engaging wheel means carried by the rear end of said support frame means for castering movement, each of said wheel means including a generally vertically disposed shaft engageable with a sleeve carried by the rear end of said support means, said sleeves being inclined forwardly when said lower draft links are in their lower position whereby castering of the rear wheels is restricted during forward movement of the transport, and said sleeves being disposed substantially vertically when said lower draft links are in their upper position whereby castering of the rear wheels is facilitated during transport of said rotary hoe sections.

7. A semi-integral transport for rotary hoe sections comprising: a generally transversely extending main frame means with hitch means disposed forwardly thereof for attachment to the draft links of a tractor, the main frame means also having auxiliary attachment means adjacent one end thereof for optional connection to the tractor and facilitating pulling the transport endwise, support frame means non-rotatably secured to said main frame means and extending rearwardly therefrom, first and second ground-engaging wheel means secured to said rearwardly extending support frame means for castering movement, said first ground-engaging wheel means including a structure having a normally transversely extending stub axle upon which a wheel is mounted, a normally upwardly extending shaft secured to said rearwardly extending means for castering movement of said wheel, and wheel mounting means detachably mounting one of said front wheels on the main frame means and forwardly thereof in stationary and non-castering relation for supporting and guiding the transport when pulled endwise.

References Cited

UNITED STATES PATENTS

| | | | |
|---|---|---|---|
| 1,648,366 | 11/1927 | Schield | 172—323 |
| 2,203,972 | 6/1940 | Silver | 172—321 |
| 2,722,876 | 10/1955 | London | 172—321 |
| 2,867,452 | 1/1959 | Ricklick | 280—492 |
| 2,889,890 | 6/1959 | Bronleewe | 172—626 X |
| 3,062,563 | 11/1962 | Pearce | 172—439 X |
| 3,139,943 | 7/1964 | Evans et al. | 172—449 X |
| 3,163,444 | 12/1964 | Smith | 280—492 |
| 3,207,233 | 9/1965 | Schumaker | 172—445 X |
| 3,235,013 | 2/1966 | Kirkpatrick | 172—413 |

FOREIGN PATENTS

| | | |
|---|---|---|
| 691,526 | 5/1953 | Great Britain. |
| 588,447 | 3/1957 | Italy. |
| 138,679 | 1/1953 | Sweden. |

OTHER REFERENCES

John Deere Operators' Manual OM–DS–1153; Sept. 1, 1955, pages 6 and 7.

ABRAHAM G. STONE, *Primary Examiner.*

J. R. OAKS, *Assistant Examiner.*